US006690647B1

(12) United States Patent
Tang et al.

(10) Patent No.: US 6,690,647 B1
(45) Date of Patent: *Feb. 10, 2004

(54) METHOD AND APPARATUS FOR CHARACTERIZING NETWORK TRAFFIC

(75) Inventors: Puqi P. Tang, Portland, OR (US); Tsung-Yuan C. Tai, Portland, OR (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/020,207

(22) Filed: Feb. 6, 1998

Related U.S. Application Data

(60) Provisional application No. 60/073,175, filed on Jan. 30, 1998.

(51) Int. Cl.[7] .............................. H04J 3/16; H04L 12/56
(52) U.S. Cl. .................. 370/235; 370/395.21; 370/443; 370/468
(58) Field of Search ................................. 370/229, 230, 370/231, 235, 252, 443, 465, 477, 253, 241, 401, 395.21, 395.43, 395.52, 234, 236; 709/224, 228–230, 231, 232, 233

(56) References Cited

U.S. PATENT DOCUMENTS

| | | | | |
|---|---|---|---|---|
| 5,461,611 A | * | 10/1995 | Drake, Jr. et al. | 370/463 |
| 5,499,238 A | * | 3/1996 | Shon | 370/339 |
| 5,787,071 A | * | 7/1998 | Basso et al. | 370/231 |
| 5,898,673 A | * | 4/1999 | Riggan et al. | 370/237 |
| 5,995,503 A | * | 11/1999 | Crawley et al. | 370/351 |
| 6,021,263 A | * | 2/2000 | Kujoory et al. | 370/409 |
| 6,023,456 A | * | 2/2000 | Chapman et al. | 370/252 |
| 6,031,841 A | * | 2/2000 | Woundy | 370/410 |
| 6,091,709 A | * | 7/2000 | Harrison et al. | 370/235 |
| 6,104,700 A | * | 8/2000 | Haddock et al. | 370/235 |
| 6,104,720 A | * | 8/2000 | Kisor | 370/431 |

* cited by examiner

Primary Examiner—Chau Nguyen
Assistant Examiner—Soon-Dong Hyun
(74) Attorney, Agent, or Firm—Kenyon & Kenyon

(57) ABSTRACT

A method and apparatus are presented that may dynamically characterize network traffic so that a user application can reserve appropriate network resources for submitting traffic to a network. According to one embodiment, at least one value characterizing the traffic is generated and transmitted to the network. This value can be dynamically updated to ensure that an appropriate amount of network resources is reserved. Using this method and apparatus, the risk of either over-subscribing network resources or failing to reserve enough resources to provide necessary quality of service (QoS) may be eliminated.

15 Claims, 4 Drawing Sheets

METHOD AND APPARATUS FOR CHARACTERIZING NETWORK TRAFFIC

RELATED APPLICATIONS

All or part of the present application claims the benefit, under 35 U. S. C. §119(e), of a U. S. Provisional Application No. 60/073,175 filed on Jan. 30, 1998 and entitled NETWORK TRAFFIC CHARACTERIZATION USING TOKEN BUCKET MODEL.

BACKGROUND OF THE INVENTION

1. Field of the Invention

The present invention relates to Internet Quality of Service (QoS) technology. More particularly, the present invention pertains to a method and apparatus for characterizing required network resources during transmission of network traffic.

2. Related Art

Real-time media such as video and audio are often delivered over a network such as the Internet to enhance the contents of a wide variety of data. Appropriate network resource reservation and management is crucial both for the timely delivery of the traffic corresponding to these real-time media and to ensure efficient use of limited network resources. A number of methods have been proposed by organizations, such as the Internet Engineering Task Force (IETF), to provide a QoS guarantee for real-time traffic. The most prominent method for providing QoS is Resource Reservation Protocol (RSVP) (Braden, R., Zhang, L., Berson, S., Herzog, S., and Jamin, S., "RSVP—Version 1 Functional Specification", September 1997). RSVP employs a parameter known as the traffic specification (TSpec) to reserve network resources for transmitting the real-time traffic. TSpec is based on the token bucket model and is a standard parameter for characterizing a pattern. Specifically, TSpec is based on several values including the value r which is related to the average bandwidth (e. g., bytes per second) of the traffic and the value b which is an indication of how "bursty" the traffic is (e. g., fluctuations in bandwidth above and below the value for r).

RSVP requires the end-hosts to submit a request for the reservation of network resources. The network responds to the host by confirming whether or not the requested network resources have been successfully reserved. To accurately request the network resources required to deliver the real-time traffic pattern, the host must first characterize the traffic. For audio/video application developers and Internet users, pre-specifying traffic characteristics for each codec (coder/decoder) is a difficult task. The characteristics for well known audio/video codecs, such as H. 261 (International Telecommunication Union—Telecommunications Standardization Sector (ITU-T), March, 1993), and H. 263 (ITU-T, Dec. 5, 1995) can be roughly estimated. However, network traffic is highly dependent on such variables as the frame rate, the resolution, and the scene complexity. Additionally, silence suppression or interframe coding techniques, may result in varying bit rates.

In some systems, such as those with WinSock2 (Windows® Socket Version 2; an add on feature of Windows® 95 Operating System and installed in Windows® NT Operating System, Version 4 and later and Windows® 98 Operating System (Microsoft Corporation, Redmond, Wash.)), TSpec templates for a few well known codecs are accessible. This situation creates many disadvantages which result in an additional burden on the user and an inefficient use of network resources. First, using one template per codec regardless of the frame rate and scene complexity leads to inaccuracies. Second, the user application is required to take steps to determine and transmit appropriate TSpec values, while the TSpec information is often not easily accessible to the user application. Finally, when the user application is unable to access TSpec information, a trial and error method is often employed.

In a manual describing a software program using a so-called token bucket model written by C. Partridge and M. Garrett (1994), a method is described for computing token bucket parameters. For a given r, the system uses a linear pass through the pattern data to determine a large enough b value. However, the algorithm employed ignores the fact that credit growth in the token bucket model may be cut off and does not always give the optimal value for b.

Accordingly, there is a need for a method and apparatus which will automatically and accurately characterize a given traffic pattern while delivering the traffic over a network.

SUMMARY OF THE INVENTION

According to an embodiment of the present invention, a method for characterizing network traffic is provided. First, a traffic pattern for said network traffic is recorded at a source device. Then, at least one value characterizing the network traffic is generated.

DETAILED DESCRIPTION

Figure 1:
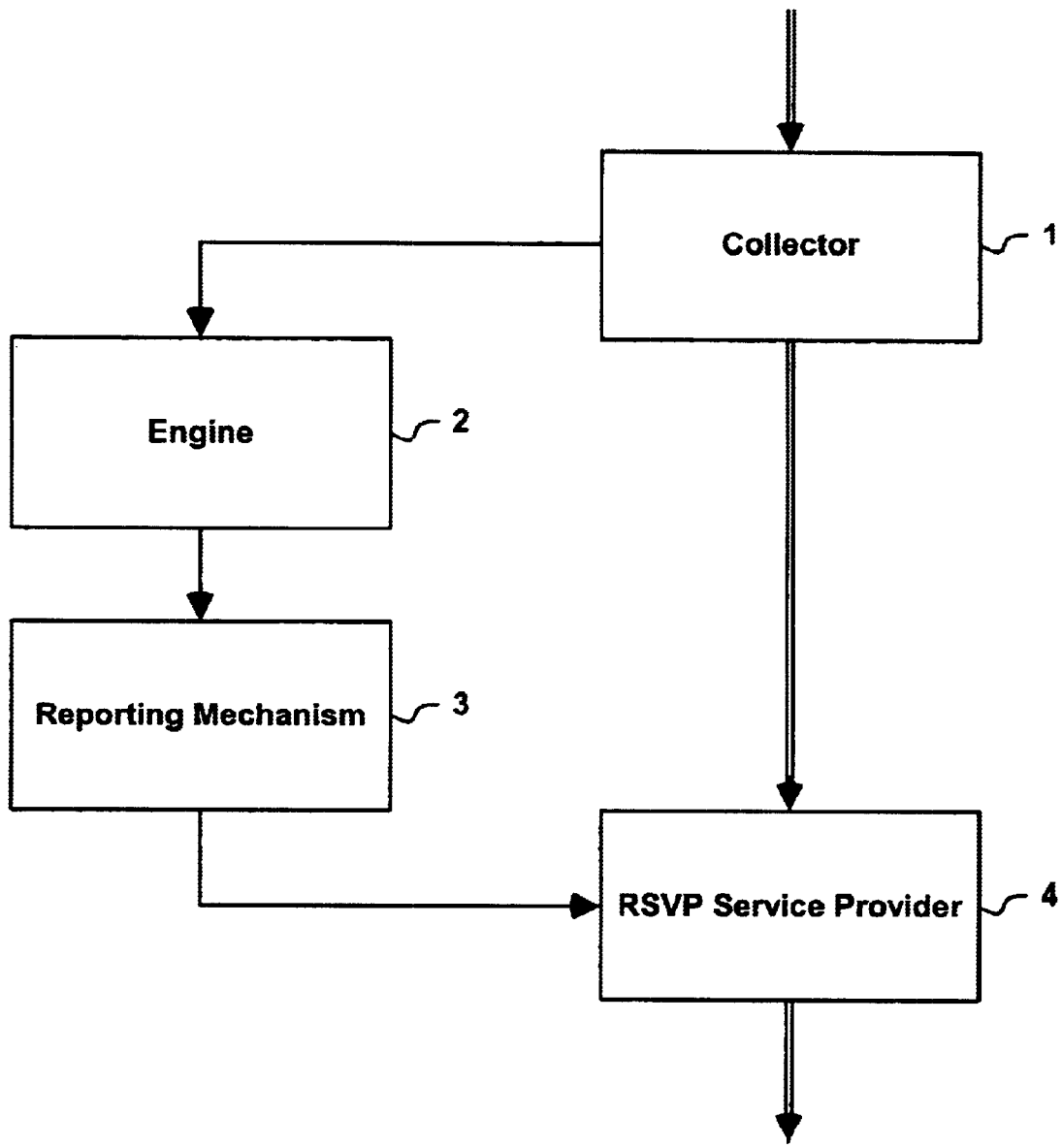
FIG. 1 is a block diagram of an apparatus for determining traffic characteristics according to an embodiment of the present invention.

A simplified block diagram of an apparatus according to an embodiment of the present invention is shown in FIG. 1. In this embodiment, functional blocks are shown which can be implemented as a set of instructions residing in a storage medium (e. g., using the C/C++ programming language) executed by a processor or as individual hardware components. A service provider (e. g., an application controlling a source device such as a coder/decoder or codec) generates information to be sent out onto a network 8 (not shown in FIG. 1) to be received by one or more devices coupled to network 8. A collector 1 may be provided that receives and records a network traffic pattern output of the source device (not shown in FIG. 1) to assist in characterizing the traffic of the information being sent to the network. In this embodiment, collector 1 collects packet length and corresponding packet arrival time information. An engine 2 is provided coupled to an output of collector 1. In this embodiment, engine 2 generates at least one value that characterizes the network traffic being output by the source device. A reporting mechanism 3 may be provided to receive the value characterizing the network traffic pattern and report the value to the network (e. g., to set up a reserved bandwidth for the transmission of data from the source device) via an RSVP service provider 4.

Figure 2:
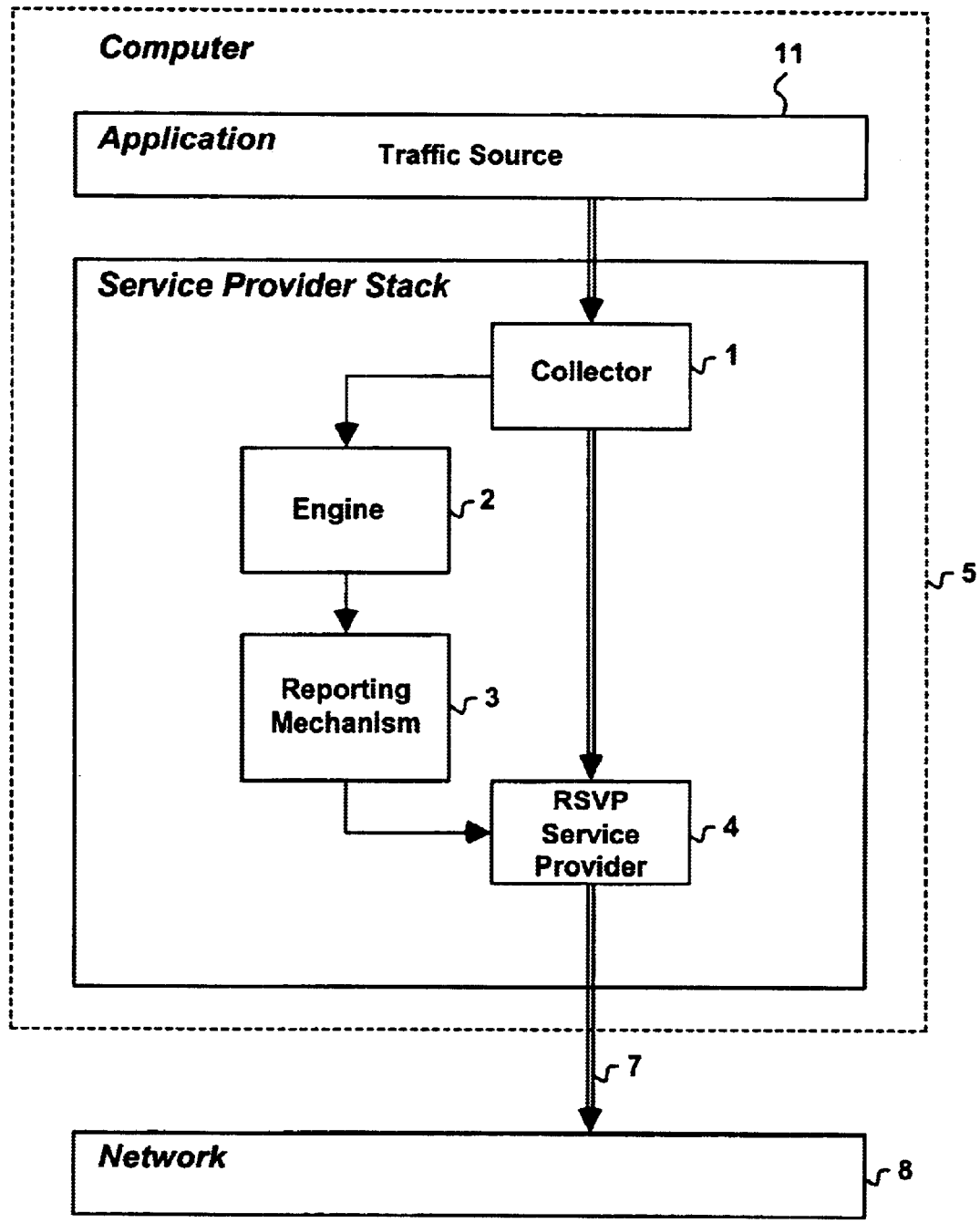
FIG. 2 shows the apparatus of FIG. 1 included within a computer for determining token bucket based traffic characteristics according to an embodiment of the present invention.

FIG. 2 shows an example of the apparatus of FIG. 1 included within a host device 5 (e. g. a computer including a Pentium® II Processor (Intel Corporation, Santa Clara, Calif.)). Host device 5 includes an application 11 controlling a number of service providers such as a source device (e. g. a H. 263 codec signal generator) and an RSVP service provider 4. The service providers control the transmission of packets via a network layer to line 7 and network 8. In this embodiment, network 8 is the Internet. The service providers also provide network traffic pattern data to an input of collector 1. As used herein, the term "coupled" refers to both direct and indirect coupling of components. In this embodiment, collector 1 records the packet length and time (e. g., the time the packet is sent from the application to the service provider (source device)) for one or more packets and transmits these values to engine 2. In this example using the RSVP token bucket model, engine 2 uses the packet length and time values from the collector 1 to compute values to characterize the network traffic being generated by the traffic source such as the optimal values for r and b described above as well as values for the peak rate (p) and the maximum packet size (M). In this embodiment, RSVP reporting engine 3 receives these four values from engine 2 as well as the value for the minimal policing size (m) which is configured by the user. In this token bucket example, reporting mechanism 3 can generate the TSpec values based on the values it receives from engine 2 and the user. Reporting mechanism 3 can report the TSpec values to RSVP service provider 4 which transmits the TSpec values to the network in a known manner as defined in the RSVP specification.

The method and apparatus of this embodiment of the present invention will now be further explained in the context of RSVP and the token bucket model; however, the present invention is intended for use with other network traffic pattern characterization models. A token bucket is a non-negative credit counter which accumulates credits at a constant rate (r) until the credit counter reaches an upper bound (b). The traffic includes a series of packets. The packets can be of varying length and are typically separated by varying time intervals. A packet of data will be immediately transmitted upon arrival at the source device if the packet size in bytes is less than or equal to the number of credits present in the token bucket. In this case, the packet size is subtracted from the credit count. If the byte size of the arriving packet exceeds the number of the credits present in the token bucket, the packet will be either dropped or queued until more credits accumulate in the bucket. When the flow is idle or running at a low rate, the token count will continue to replenish credits at the rate r until the credit count reaches the upper bound b and in that case the credit growth will be suspended until the arrival of the next packet. The token bucket model characterizes a traffic pattern in terms of the parameters r and b. Once a traffic pattern is characterized by the parameters r and b, reservation of an appropriate amount of network resources can be requested. While there are a number of r and b values which ensure that all arriving packets in the traffic will be transmitted without delay upon their arrival, an optimal (r, b) pair will minimize certain prescribed cost functions such as (r+b).

The token bucket model can be extended by adding a queue. The queue is used to store the incoming stream of data packets at the source device until enough credits accumulate in the token bucket. With a queue, the traffic pattern can be suitably changed so that the token bucket model for the post-queuing traffic pattern is more stationary than the strict no-delay model described above. A token bucket with a queue is able to accommodate a wider variety of traffic patterns. Queuing also avoids dramatically increasing the size and rate of the token bucket when the traffic pattern flow becomes bursty. When the parameters of a given token bucket are not large enough to satisfy the no-delay requirement for a given traffic pattern, a challenge exists in determining the minimal size of the queue (q) which will ensure that the traffic flow after queuing can be modeled by that token bucket. The present invention can be adapted to characterize a given traffic pattern in terms of optimal token bucket parameters (r and b) both with and without the addition of a queue.

According to an embodiment of the present invention, collector 1 records the network traffic pattern generated by the traffic source. The traffic includes a series of packets and the traffic pattern can be described by the notation P+e, dus $\Delta\{(p_i, t_i) | 1 \leq i \leq n\}$, where $p_i$ represents the length of the i-th packet and $t_i$ represents the arrival time of the i-th packet at the service provider. Collector 1 transmits the traffic pattern (P) to engine 2. Engine 2 employs an algorithm to characterize the traffic pattern (P) by determining the corresponding optimal token bucket rate (r) and the corresponding optimal token bucket size (b).

In one example of an algorithm, the first step entails determining the range of the traffic pattern's token bucket rate using the following relationships:

$$r_{\min} = \max_{1 \leq k \leq n} \frac{\sum_{i=1}^{k} p_i - c_0}{t_k - t_0}$$

$$r_{\max} = \max_{2 \leq k \leq n} \left\{ \frac{p_1 - c_0}{t_1 - t_0}, \frac{p_k}{t_k - t_{k-1}} \right\}$$

where $r_{min}$ is defined as the lower bound for r, k is an index, $c_0$ is the initial token count existing in the token bucket at $t_0$, and $r_{max}$ is defined as the upper bound for r. If the token bucket is initially full, $r_{max}$ is set equal to the peak rate for the traffic pattern and the relationships for determining $r_{min}$ and $r_{max}$ are as follows:

$$r_{\min} = \frac{\sum_{k=1}^{n} p_k}{t_n - t_0}$$

$$r_{\max} = p = \max_{1 \leq k \leq n} \frac{p_k}{t_k - t_{k-1}}$$

Once the range of the token bucket rate for the traffic pattern is determined, the algorithm uses the following relationships to determine the range of the token bucket size:

$$b_{\min} = \max_{1 \leq k \leq n} (p_k, c_0)$$

$$b_{\max}(r) = \max_{1 \leq i \leq n} c_k(r)$$

where $b_{min}$ is a lower bound for b, $b_{max}$ is an upper bound for b, and $c_k(r)$ is given by the following expression:

$$c_k(r) = c_0 + r(t_k - t_0) - \sum_{i=1}^{k-1} p_i$$

Within the range of the four values determined above, there are a number of token bucket parameter pairs (r and b) which characterize the traffic pattern and satisfy the no-delay requirement. The relationship between these (r, b) pairs, within the range of the above four determined values, can be illustrated graphically by plotting a no-delay TB curve. A best example of a mathematical expression describing the no-delay TB curve is:

$$b_{opt}(r) = \max_{1 \leq u \leq v \leq n} \left( \sum_{i=u}^{v} p_i - r(t_v - t_u) \right)$$

Figure 3:
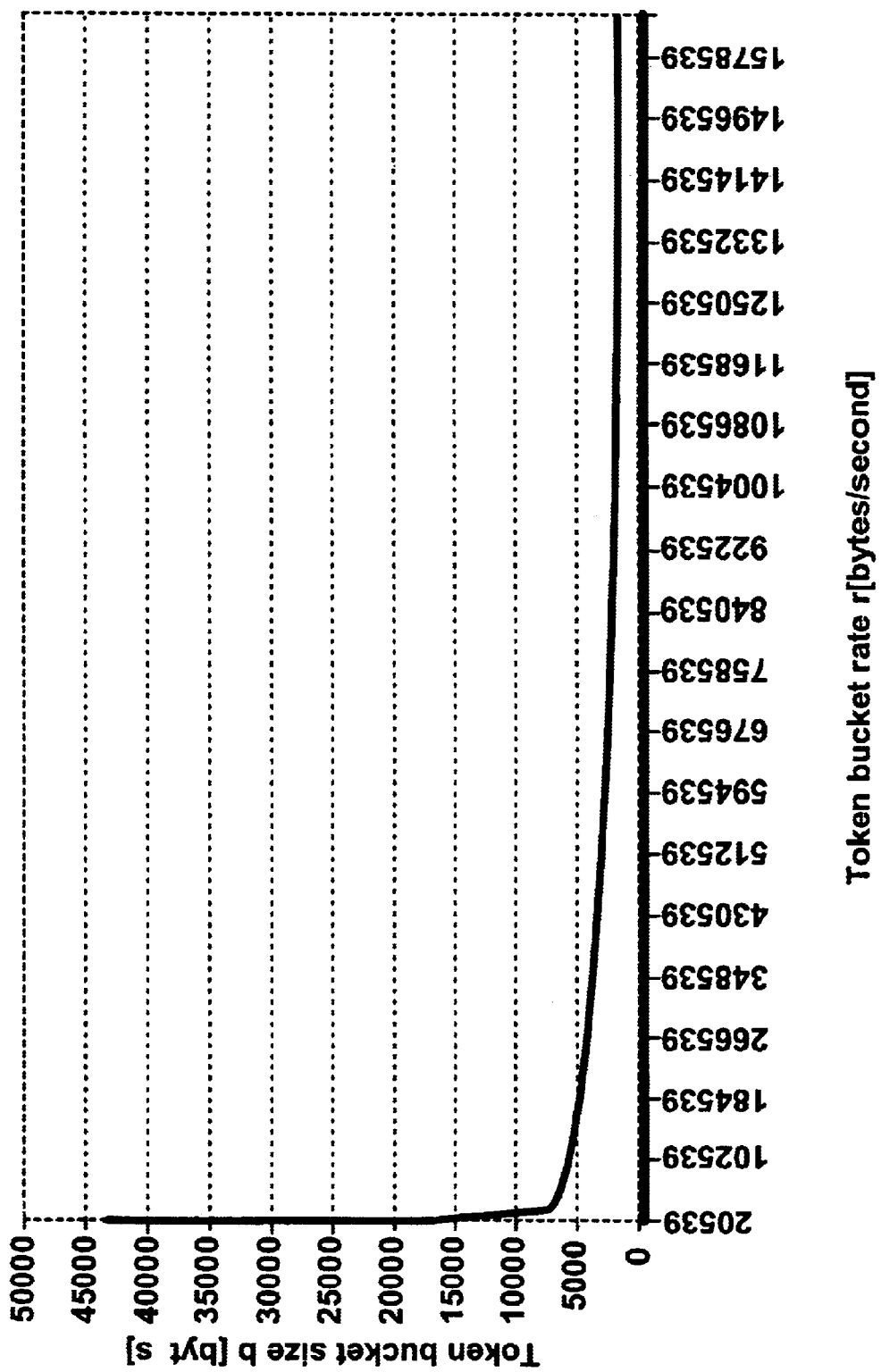
FIG. 3 shows a no-delay TB (token bucket) curve for an example of a traffic pattern.

A best example of an algorithm for determining the values of the above mathematical expression is:

$d_1 = b_1 = p_1$ $d_k = \max(d_{k-1} + (p_k - r\Delta_k), p_k), k > 1$ $b_k = \max(b_{k-1}, d_k), k > 1$ where $d_k$ is an auxiliary variable and $b_n$ gives the value for $b_{opt}(r)$. This algorithm is useful in determining the no-delay TB curve when there is no queue. FIG. 3 illustrates an example of a no-delay TB curve; the token bucket size (in bytes) is along the vertical axis and the token bucket rate (in bytes/second) is along the horizontal axis. The curve in FIG. 3 was determined using the above algorithm for traffic which represents a clip from the movie "True Lies." This clip contains 1,664 packets and 1,989,862 bytes. The average rate is $r_{min}$=20,539 bytes/second and the peak rate is $r_{max}$=1,652,500 bytes/second.

The optimal token bucket rate and optimal token bucket size are determined from the no-delay TB curve. An optimal token bucket rate and token bucket size would be to minimize r+b. While r+b is a typical cost function to be minimized, different cost functions may be used in other situations. Experimentation has determined that one of the best methods for determining the optimal token bucket rate ($r_{opt}$) entails the following steps: 1) determine the difference between $r_{min}$ and $r_{max}$, 2) calculate 5% of the determined difference between $r_{min}$ and $r_{max}$, 3) add this 5% value to $r_{min}$ to calculate $r_{opt}$. Once $r_{opt}$ is determined, the corresponding optimum token bucket size, $b_{opt}$ can be determined from the no-delay TB curve.

A second example of an algorithm for determining the no-delay TB curve uses a binary search to determine the minimal b in its range such that the number of credits in the token bucket is greater than the byte size of each packet in the traffic pattern ($c_k(r,b) \geq p_k$ for all k). This algorithm does not use the explicit solution for the optimal token bucket size and is illustrated below in psuedo code:

Input parameters:
  Traffic pattern: P={$(p_i, t_i)$|i=1,2, ..., n}
    where $p_i$ and $t_i$ are the i-th packet's length and arrival time, respectively.
  Queue size: q
Output parameters:
  Token bucket rate: r
  Token bucket size: b
Internal Variables
  Number of bytes backlogged immediately prior to $t_k$: g(k)
  Maximal number of bytes backlogged: g
  Number of tokens in the bucket immediately prior to $t_k$: c(k)
  Number of packets sent out so far until $t_k$: I(K)
Algorithm:

1. Compute c(k) and I(k) inductively where
   I(k) is set to the largest index k', k'<k, such that c(k−1)+ $r(t_k - t_{k-1}) - (p_{I(k-1)+1} + \ldots + p_k) \geq 0$;
   c(K) is set to $\min(c(k-1) + r(t_k - t_{k-1}) - (p_{I(k-1)+1} + \ldots + p_{I(k)}), b)$; with
   c(1)=b;
   I(1)=0;
2. Compute g(k) based on c(k) and I(k)
   g(k)=0, If I(K)=k−1 and $c(k) \geq p_k$, $p_{I(k)+1} + \ldots + p_k$, otherwise;
   g=max g(k);
3. Compute the following:
   MeanRate=$(p_1+p_2+ \ldots p_n)/t_n$;
   PeakRate=$\max(p_k/(t_k-t_{k-1}))$;
   bLower=max $p_k$;
   bUpper=$p_1+p_2+ \ldots + p_n$;
4. For any r between MeanRate and PeakRate, do a binary search for the minimal b in the range of bLower and bUpper such that g is less than or equal to q.

This second algorithm can be adapted to determine the TB curve when a queue is available.

Figure 4:
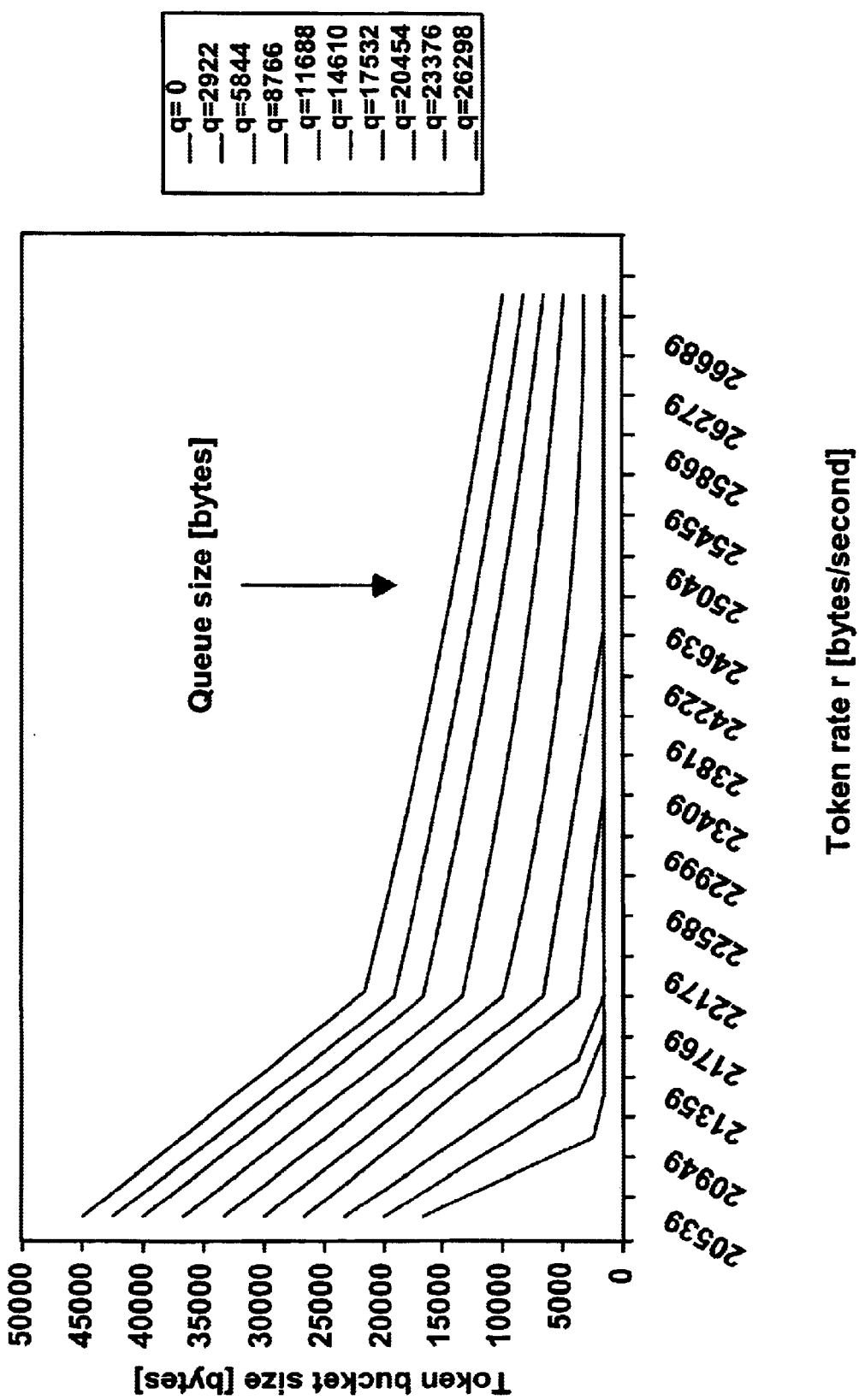
FIG. 4 shows queuing TB curves for the traffic pattern of FIG. 3.

FIG. 4 illustrates a series of 10 queuing TB curves with various queue sizes. The curves were determined by applying the second algorithm to the previously described "True Lies" clip. The queuing TB curve parameterized by q=0 coincides with the no-delay TB curve in FIG. 3. As illustrated in FIG. 4, the greater the capacity of the queue, the lower the queuing TB curve on the (r, b) plane. The lower queuing TB curves require the reservation of fewer network resources. Thus, systems with more resources invested in memory capacity available for a queue reserve less resources on the network.

As described above, engine 2 also determines the peak rate (p), and the maximum packet size (M) along with an optimal token bucket rate (r) and token bucket size (b). These four parameters, when combined with the user defined minimal policing size (m) as known in the art are defined as the TSpec value for a traffic pattern. TSpec characterizes the traffic and is used to request the reservation of the network resources which will be required for the timely and efficient transmission of the traffic over the network. The TSpec values can be generated by reporting mechanism 3 with the $r_{opt}$, $b_{opt}$, M, and p values from engine 2 and the m value from the user. Reporting mechanism 3 transmits a trigger signal to RSVP service provider 4, which then transmits the TSpec parameters, known in the art as the PATH message, over the network to the intended recipient(s) of the network traffic. A reserve message (RSVE), generated by each intended recipient, is transmitted back to the host. As known in the art, the RSVE message from the network indicates whether or not the requested network resources have been reserved.

Engine 2 can periodically determine new optimal token bucket rate and optimal token bucket size values which can be selectively reported to the network. These new values can be compared to the previous values, so that if the new and the previous values are within a predetermined range of each other, the new values are not transmitted to the network. If the new values are outside the predetermined range, the new optimal values (and thus new TSpec) will be transmitted to the network to request resource reservation.

The present invention may characterize network traffic dynamically and in a manner transparent to the user application. In one embodiment, for the first few seconds of transmission from the host, the data is transmitted on a best efforts basis. Best efforts means the traffic employs whatever network resources are available between the host and the recipient without reservation. Once the present invention has sampled the outgoing traffic pattern and characterized the network traffic in the manner described above, appropriate network resources are reserved for transmitting further traffic to the network. Thus, the risk of over-subscribing or failing to reserve enough network resources to provide the necessary QoS can be eliminated.

Although several embodiments are specifically illustrated and described herein, it will be appreciated that modifications and variations of the present invention are covered by the above teachings and within the purview of the appended claims without departing from the spirit and intended scope of the invention.

What is claimed is:

1. A method for characterizing network traffic generated by a traffic source at a host device, comprising:
    recording at said host device a network traffic pattern for said network traffic generated by said traffic source;
    generating at said host device at least one value characterizing said network traffic;
    reporting at said host device said at least one value characterizing said network traffic to a network; and
    receiving at said host device a response from said network indicating whether network resources corresponding to the reported at least one value have been reserved.

2. A method for characterizing network traffic generated by a traffic source, comprising:
    recording a network traffic pattern for said network traffic generated by said traffic source;
    generating at least one value characterizing said network traffic;
    updating said at least one value characterizing said network traffic; and
    selectively reporting said updated value to the network.

3. The method of claim 2, wherein generating said at least one value characterizing said network traffic further includes:
    determining a lower bound for a token bucket rate;
    determining an upper bound for a token bucket rate;
    determining a lower bound for a token bucket size;
    determining an upper bound for a token bucket size;
    determining a relationship between a token bucket rate and a minimum token bucket size to accommodate said network traffic; and
    determining an optimum token bucket rate and a corresponding optimum token bucket size corresponding to said network traffic pattern using the determined relationship between the token bucket rate and the minimum token bucket size.

4. The method according to claim 3, wherein reporting said at least one value characterizing said network traffic pattern to said network further includes triggering a Resource Reservation Protocol (RSVP) service provider, the RSVP service provider being coupled to said network.

5. The method according to claim 1, wherein said network is the Internet.

6. An apparatus for characterizing network traffic generated by a traffic source, comprising:
    a host device including a collector, an engine, a reporting mechanism, and said traffic source;
    said collector to store a network traffic pattern for the network traffic generated by said traffic source;
    said engine coupled to said collector and adapted to generate at least one value characterizing said network traffic; and
    said reporting mechanism coupled to said engine and adapted to receive said value characterizing said network traffic and adapted to report said value characterizing said network traffic to a network; said apparatus further adapted to receive a response from said network that indicates whether network resources corresponding to said value have been reserved.

7. The apparatus of claim 6, wherein said network traffic generated by said traffic source includes a plurality of packets and said collector is adapted to transmit packet size values and time of receipt values to said engine.

8. An apparatus for characterizing network traffic generated by a traffic source, comprising:
    a collector adapted to store a network traffic pattern for the network traffic generated by said traffic source wherein said network traffic generated by said traffic source includes a plurality of packets and said collector is adapted to transmit packet size values and time of receipt values to said engine and wherein said network traffic is represented as a token bucket model and said engine is adapted to generate an optimal token bucket rate and an optimal token bucket size based on said packet size values and time of receipt values from said collector; and
    an engine coupled to said collector and adapted to generate at least one value characterizing said network traffic.

9. The apparatus of claim 8, further comprising:
    a Resource Reservation Protocol (RSVP) service provider coupled between said reporting mechanism and said network and wherein said reporting mechanism is adapted to trigger said RSVP service provider to transmit said optimal token bucket size and optimal token bucket rate to said network.

10. The apparatus of claim 9, wherein said network is the Internet.

11. A set of instructions residing in a storage medium said set of instructions capable of being executed by a processor to implement a method for characterizing network traffic generated by a traffic source in a host device, the method comprising:
    recording at said host device a network traffic pattern for said network traffic generated by said traffic source;
    generating at said host device at least one value characterizing said network traffic;
    reporting at said host device said at least one value characterizing said network traffic to a network;
    receiving at said host device a response from said network indicating whether network resources corresponding to the transmitted at least one value have been reserved.

12. A set of instructions residing in a storage medium said set of instructions capable of being executed by a processor to implement a method for characterizing network traffic generated by a traffic source, the method comprising:
    recording a network traffic pattern for said network traffic generated by said traffic source; and
    generating at least one value characterizing said network traffic;
    updating said at least one value characterizing said network traffic; and
    selectively reporting said updated value to the network.

13. The set of instructions of claim 12, wherein generating said at least one value characterizing said network traffic further includes:

determining a lower bound for a token bucket rate;

determining an upper bound for a token bucket rate;

determining a lower bound for a token bucket size;

determining an upper bound for a token bucket size;

determining a relationship between a token bucket rate and a minimum token bucket size to accommodate said network traffic; and determining an optimum token bucket rate and a corresponding optimum token bucket size corresponding to said network traffic pattern using the determined relationship between the token bucket rate and the minimum token bucket size.

14. The set of instructions of claim 13, wherein reporting said at least one value characterizing said network traffic pattern to said network further includes triggering a Resource Reservation Protocol (RSVP) service provider, the RSVP service provider being coupled to said network.

15. The set of instructions according to claim 11, wherein said network is an Internet.

* * * * *